Figure 3:
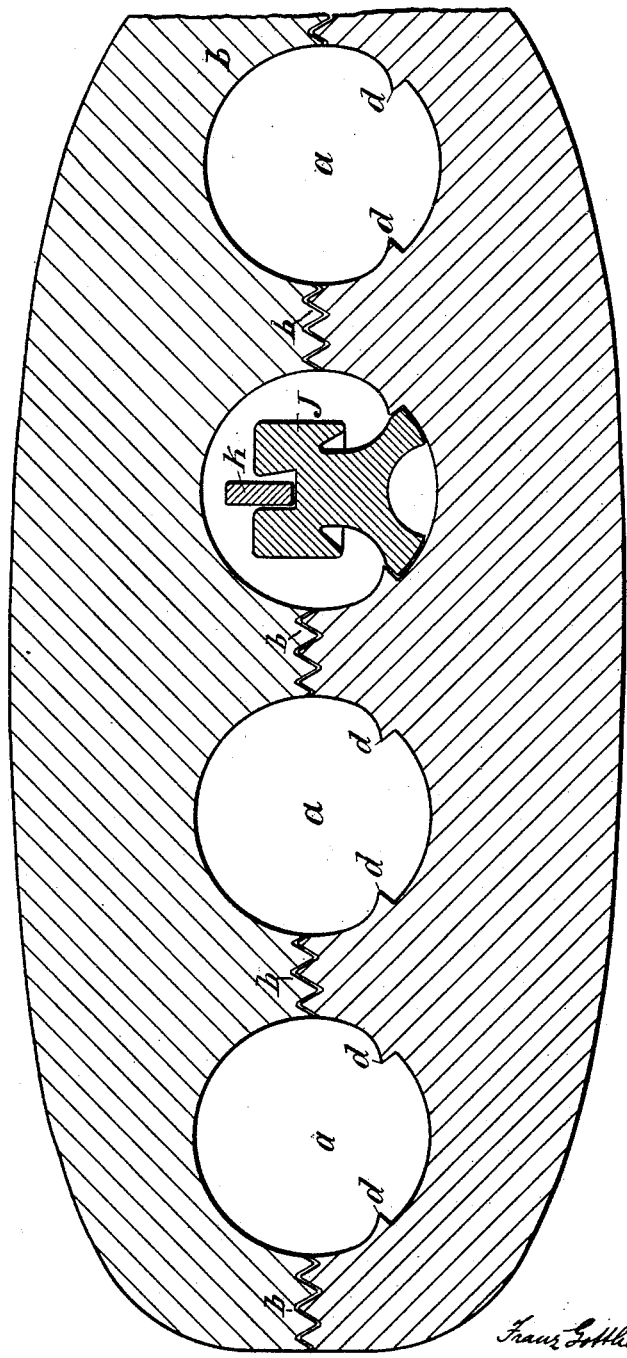

(No Model.) 3 Sheets—Sheet 1.
F. G. C. ZÖPKE.
UNDERGROUND ELECTRIC CONDUIT.
No. 434,076. Patented Aug. 12, 1890.
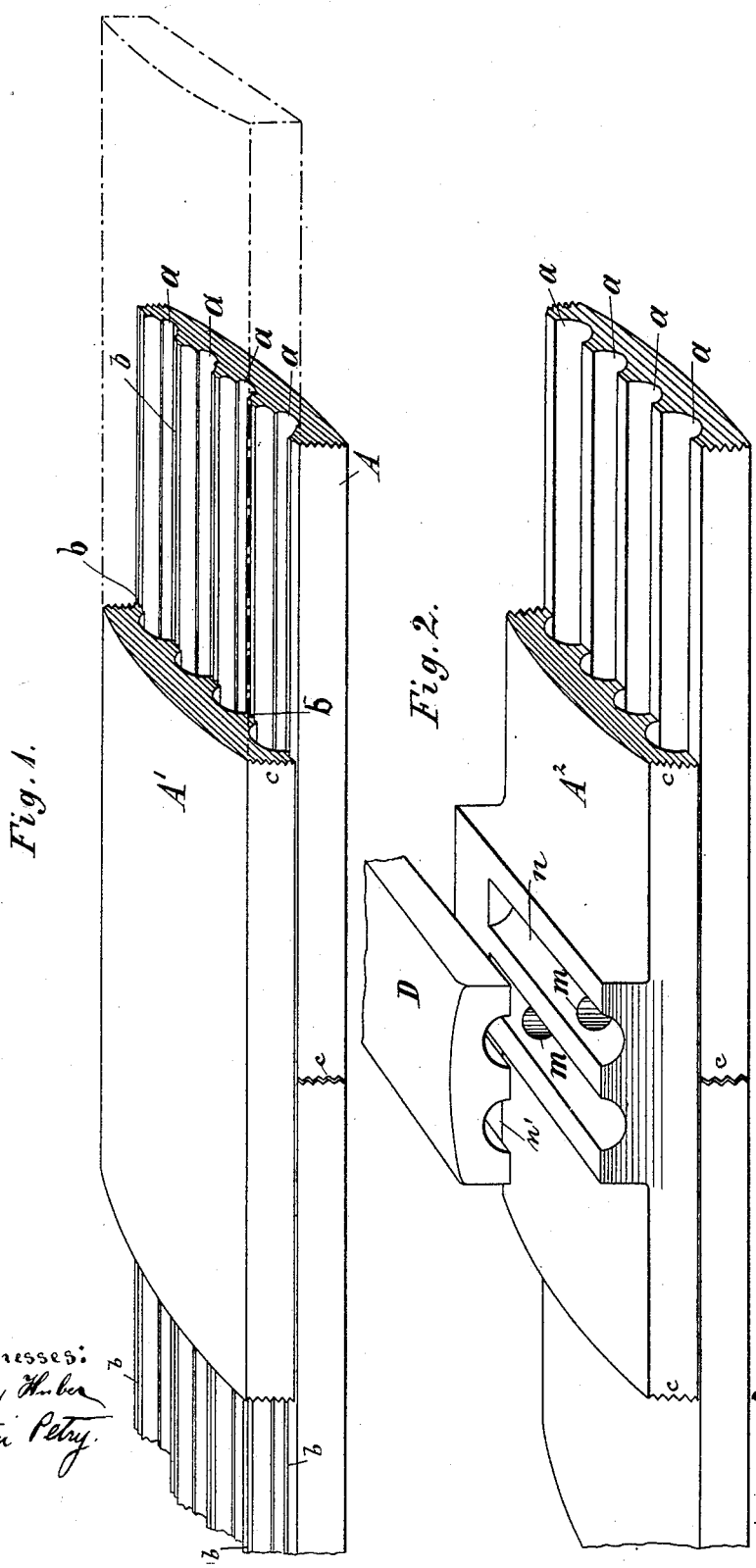
Witnesses:
Henry Huber
Martin Petry
Inventor
F. G. C. Zöpke
by
Goepel & Raegener
Attorneys.

(No Model.) 3 Sheets—Sheet 2.

F. G. C. ZÖPKE.
UNDERGROUND ELECTRIC CONDUIT.

No. 434,076. Patented Aug. 12, 1890.

Witnesses:
Henry Huber
Martin Petry.

Inventor
Franz Gottlieb Christian Zöpke
by Jacque Raegener
Attorneys.

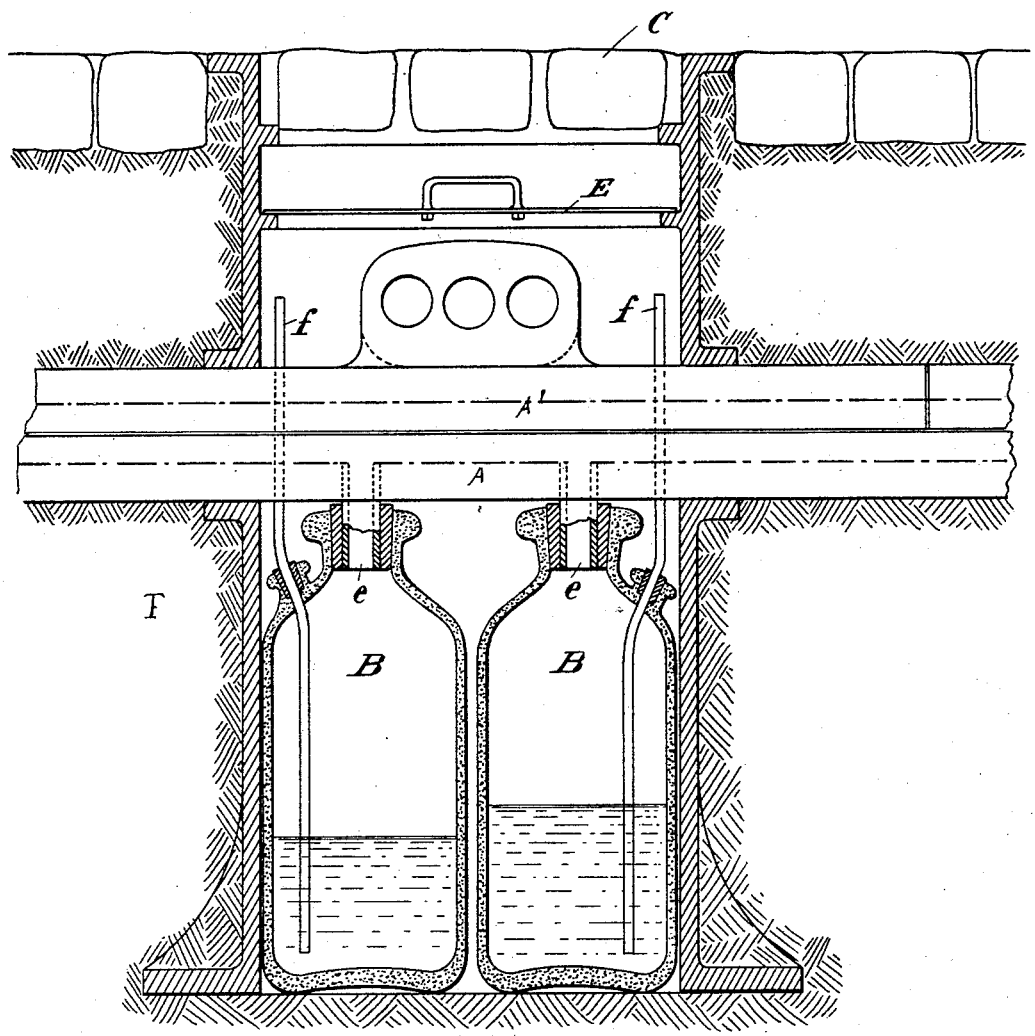

UNITED STATES PATENT OFFICE.

FRANZ GOTTLIEB CHRISTIAN ZÖPKE, OF BERLIN, GERMANY.

UNDERGROUND ELECTRIC CONDUIT.

SPECIFICATION forming part of Letters Patent No. 434,076, dated August 12, 1890.

Application filed December 21, 1889. Serial No. 334,554. (No model.)

*To all whom it may concern:*

Be it known that I, FRANZ GOTTLIEB CHRISTIAN ZÖPKE, a subject of the King of Prussia, German Empire, and residing at the city of Berlin, in the Kingdom of Prussia, Germany, have invented certain new and useful Improvements in Underground Conduits for Electric Wires, of which the following is a specification.

Heretofore underground wires were arranged as cables provided with a lead coating, and it has been customary quite lately to use bare copper wires or bars placed in isolated channels. The defects of these constructions consist, mainly, in the slight stability and great porosity of the boxes in which the cables are placed and into which boxes the water could readily pass. The water of condensation collected in the channels and the boxes frequently broke, thus causing earth-circuits and short-circuits.

The object of my invention is to prevent water passing into the conduits; further, to prevent formation of acids by excluding all iron and other metals, except the conductors in the conduits; further, to prevent short circuits in case the conduit breaks, and finally to provide means for conducting off the water of condensation, thereby excluding all possibility of the formation of earth or secondary circuits.

In the accompanying drawings, Figure 1 is a perspective view of part of my improved underground conduit for electric conductors, parts being in section. Fig. 2 is a similar view showing the arrangement for the branches or crossings. Fig. 3 is a vertical transverse sectional view of my improved conduit on an enlarged scale, also showing the insulated supporters for the conductors. Fig. 4 is a vertical transverse sectional view of one of the well-holes, showing the receptacles for receiving the water of condensation.

Similar letters of reference indicate corresponding parts.

The conduit is composed of the bottom sections A and upper or cover sections A', made of burned earthenware, glazed on the inner and outer surfaces so as to be absolutely water-tight. Each bottom section is provided with a series of longitudinal grooves, which, with the corresponding grooves in the cover-sections, form one, two, or more cylindrical channels $a$ in the conduit. The ridges between the grooves are provided with longitudinal ribs $b$, into which some water-proof cementing substances—such as water-glass, asphalt, and the like—are poured before placing the cover-sections on the base-sections. The ends of the base and cover sections are provided with like ribs $c$, which are also provided with a binding mass between the abutting sections.

As shown in Fig. 1, the base and cover sections A and A', respectively, are arranged as break-joints, thereby insuring stability against pressure from above and also preventing leaks. The channels $a$ are also provided in their bottoms with longitudinal offsets $d$, between which the proper porcelain or other insulators J are placed, which serve for supporting the electrical conductors $k$. For making connection similar devices are used.

As shown in Fig. 2, the cover-section $A^2$ at the connection is provided with grooves $n$ at right angles to the channels $a$, and said section $A^2$ is provided with a cover-plate D, also having grooves $n'$ in its under side. Apertures $m$ lead from the grooves $n$ in the sections $A^2$ to the channels $a$, formed between the main base and cover-sections A and A'. The connections between the main conductors and the branch conductors pass through said apertures $m$. The same connection (shown in Fig. 2) is used when the main and secondary lights are connected, which connections, however, are preferably placed in a cast-iron or other well-hole F, provided with covers C and E. At said well-holes the channels in the conduit are provided with downwardly-projecting necks $e$, which pass into the necks of the receptacles or bottles B, placed in the bottom of the well-hole, and which serve to collect the water of condensation from the channels.

The bottles or receptacles B are provided with tubes $f$, through which the water can be removed from the receptacles. The formation of earth and short circuits in the conduit by water is thus absolutely prevented.

In place of making the conduits of earthenware they can be made of asphalt. The pulverized asphalt is pressed between hot molds, and after the sections have been laid the joints are closed by running hot irons over the joints. If desired, the conduit may be made at the same time that the wires or conductors are being laid, which is accomplished in the following manner: After the trench has been made, it is provided on its bottom with a bedding of asphalt or like material, and into this bedding while soft halves of earthenware or other non-conducting pipes or long bars or plates are pressed. The conductors are placed into the said half-pipes or upon the bars. Then other half-pipes are placed over the conductors and are covered with asphalt or other suitable material, so as to form a long and continuous box or conduit, in which the conductors are contained in suitable channels. In this construction the use of materials for closing the joints is avoided. The asphalt poured upon the upper tubes closes all the joints.

My improved conduit has the advantage that each conductor is completely isolated from all the others. The conduit is very compact, strong, and durable, and does not occupy much space, and can be placed directly below the pavement.

Having thus described my invention, I claim as new and desire to secure by Letters Patent—

1. An underground conduit for electric wires, composed of two sections, each provided in its inner face with a series of longitudinal grooves, which when united form channels for receiving the conductors, the ridges between the grooves being provided with longitudinal ribs and the ends of the sections being provided with ribs, as set forth.

2. In an underground conduit for electric conductors, the combination of two sections having longitudinal grooves in their inner surfaces, which grooves when the sections are united form longitudinal channels, the grooves in the bottom sections being provided with longitudinal offsets, and insulating conductor-supports placed between the offsets, substantially as set forth.

3. In an underground conduit for electric conductors, the combination, with a bottom section having longitudinal grooves, of a cover-section having corresponding longitudinal grooves in its bottom surface and transverse grooves in its upper surface, apertures extending from the transverse grooves to the longitudinal grooves of the upper section, and a plate for covering the transverse grooves of the upper section and provided in its under side with corresponding grooves, as set forth.

4. The combination, with an underground conduit having longitudinal channels for receiving the wires, of outlet-necks connected with said channels, and receptacles placed below the conduit and in connection with said outlet-necks for the purpose of collecting the water that accumulates in the channels, as set forth.

5. The combination, with an underground conduit having longitudinal channels for receiving electric conductors, of necks projecting downward from said channels, receptacles into which the necks project, said receptacles being placed below the conduit, and outlet-tubes in said receptacles for the purpose of removing the water from the receptacles, as set forth.

In witness whereof I have hereunto set my hand in presence of two witnesses.

FRANZ GOTTLIEB CHRISTIAN ZÖPKE.

Witnesses:
ALEX SCHOLZE.
A. Z. REICHERDT.